United States Patent
Shuto et al.

(10) Patent No.: US 9,869,920 B2
(45) Date of Patent: Jan. 16, 2018

(54) DISPLAY UNIT AND ELECTRONIC APPARATUS

(71) Applicant: SONY CORPORATION, Tokyo (JP)

(72) Inventors: Aya Shuto, Kanagawa (JP); Hidehiko Takanashi, Kanagawa (JP); Ken Kobayashi, Kanagawa (JP); Yuriko Kaino, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/900,136

(22) PCT Filed: Jun. 6, 2014

(86) PCT No.: PCT/JP2014/003041
§ 371 (c)(1),
(2) Date: Dec. 18, 2015

(87) PCT Pub. No.: WO2014/208022
PCT Pub. Date: Dec. 31, 2014

(65) Prior Publication Data
US 2016/0147127 A1    May 26, 2016

(30) Foreign Application Priority Data

Jun. 24, 2013 (JP) ................................. 2013-131427

(51) Int. Cl.
| G02B 26/00 | (2006.01) |
| G02B 26/08 | (2006.01) |
| G02F 1/29 | (2006.01) |
| G02F 1/167 | (2006.01) |

(52) U.S. Cl.
CPC ...... *G02F 1/167* (2013.01); *G02F 2001/1678* (2013.01); *G02F 2202/022* (2013.01); *G02F 2202/36* (2013.01)

(58) Field of Classification Search
USPC ................. 359/237, 242, 290–295, 296, 298
See application file for complete search history.

(56) References Cited

U.S. PATENT DOCUMENTS

| 5,547,745 A * | 8/1996 | Hansen .................. A61L 15/60 |
| | | 428/378 |
| 5,989,736 A * | 11/1999 | Lintz .................. B01D 39/2065 |
| | | 280/728.1 |
| 2007/0184348 A1* | 8/2007 | Sakurai ..................... D01F 9/14 |
| | | 429/231.8 |
| 2008/0112040 A1 | 5/2008 | Suwabe et al. |
| 2010/0134407 A1* | 6/2010 | Wang ...................... G02F 1/167 |
| | | 345/107 |
| 2012/0212798 A1* | 8/2012 | Yasui ...................... G02F 1/167 |
| | | 359/296 |
| 2012/0243073 A1 | 9/2012 | Takanashi et al. |

FOREIGN PATENT DOCUMENTS

JP    2012-022296 A    2/2012

* cited by examiner

*Primary Examiner* — Brandi Thomas
(74) *Attorney, Agent, or Firm* — Chip Law Group

(57) ABSTRACT

There is provided a display unit including: in an insulating liquid, migrating particles; non-migrating particles having optical reflection characteristics different from optical reflection characteristics of the migrating particles; and a fibrous structure formed of a chain molecule and holding the non-migrating particles, the chain molecule containing an ester group and having a main part formed of carbon atoms, oxygen atoms, and hydrogen atoms.

12 Claims, 8 Drawing Sheets

[Fig. 1]
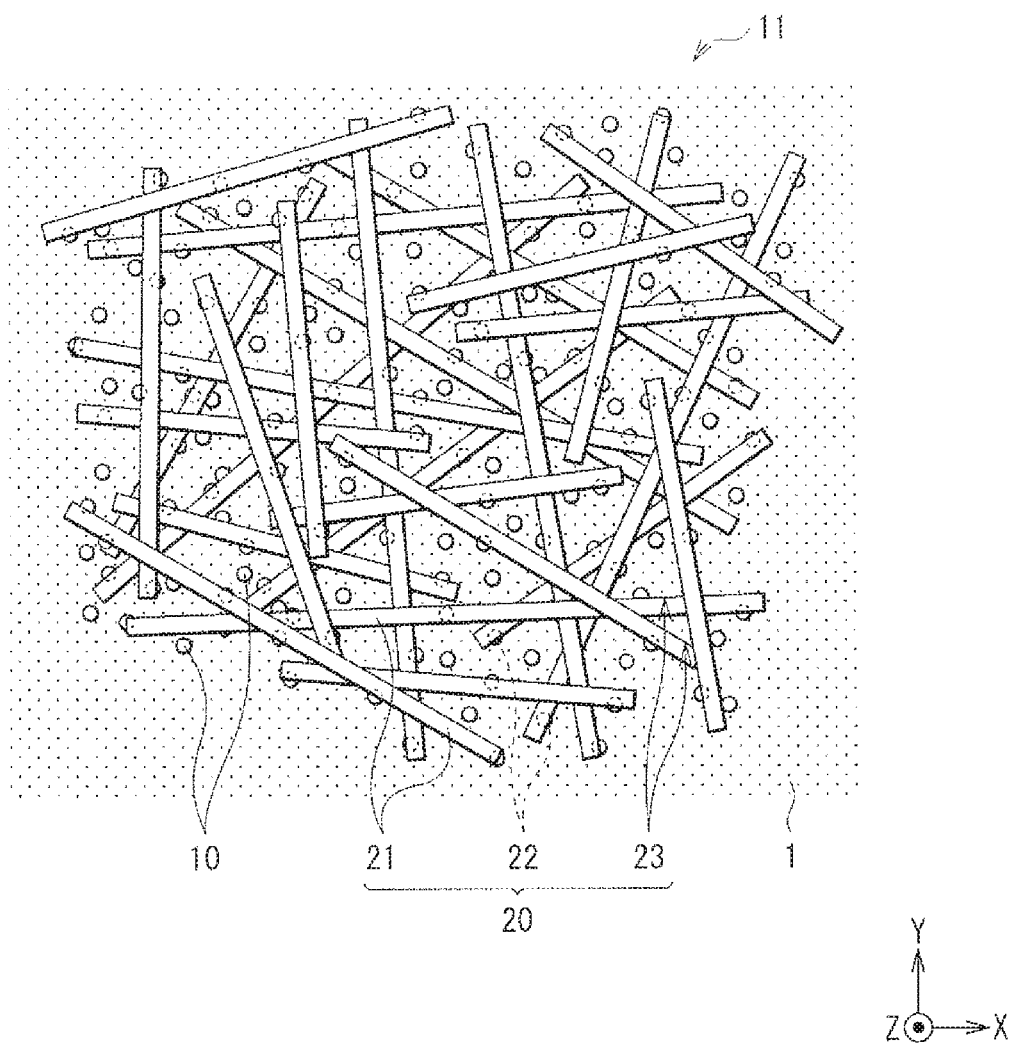
[Fig. 2]
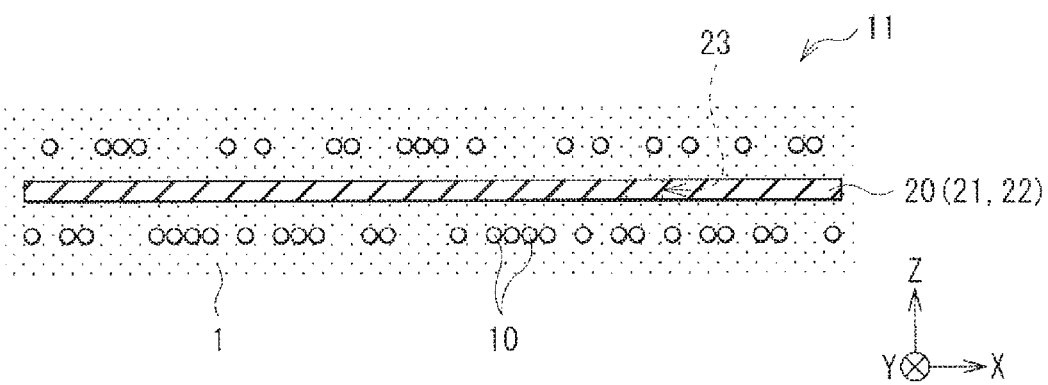

[Fig. 3]
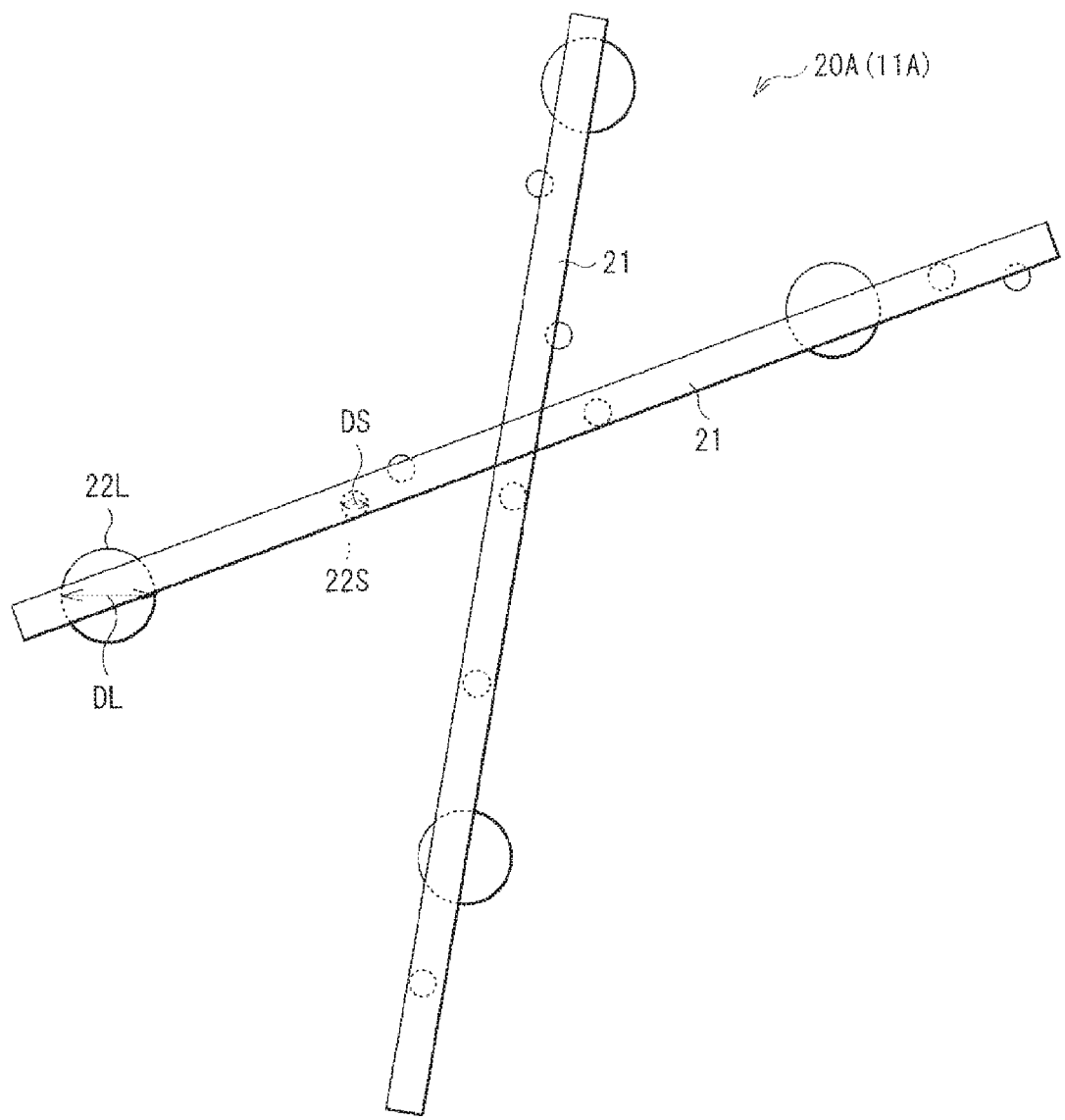

[Fig. 4]
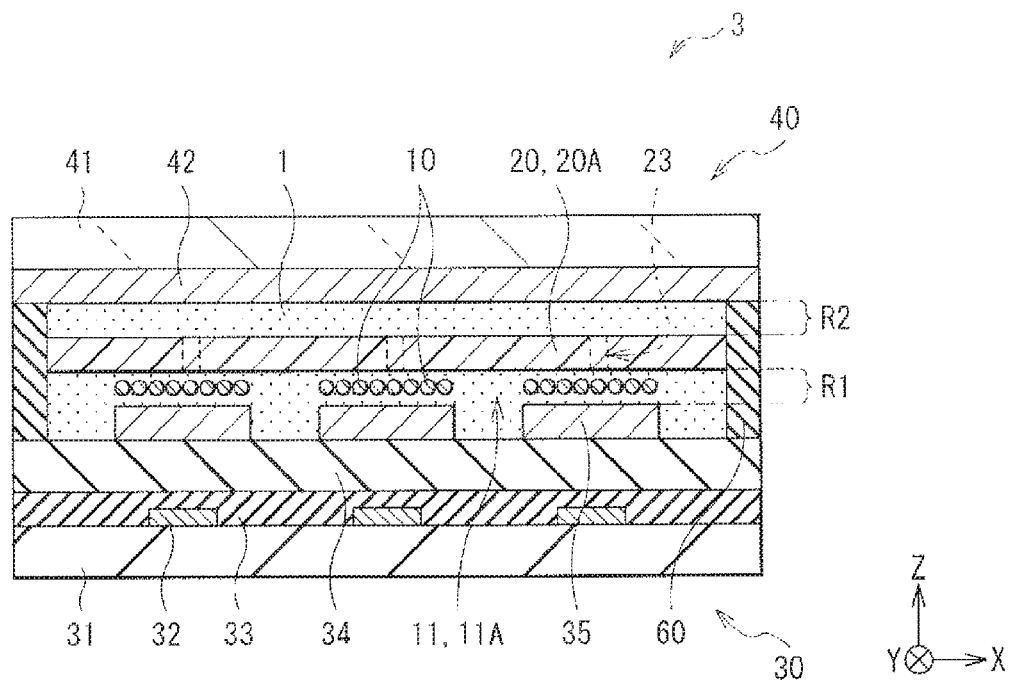
[Fig. 5]
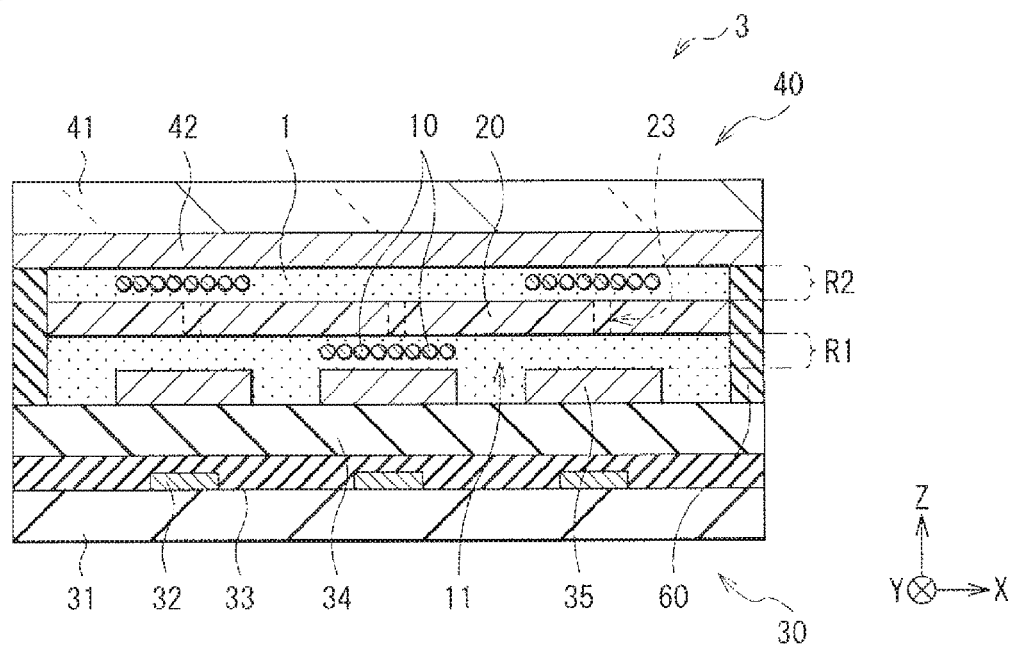

[Fig. 6A]
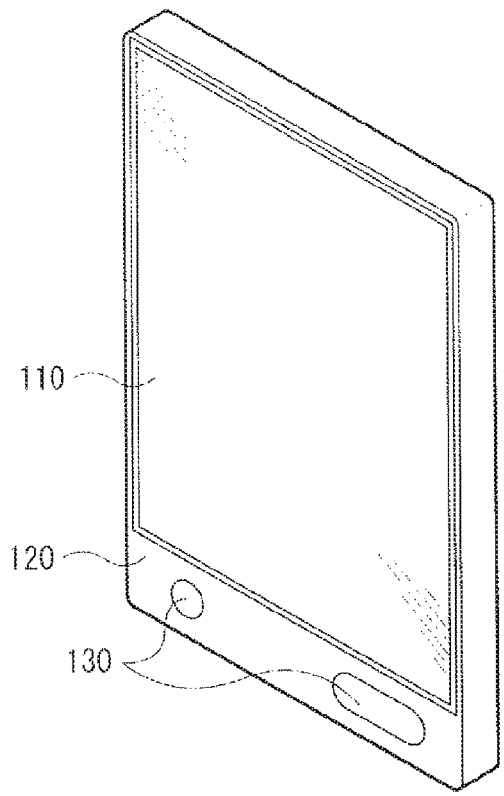
[Fig. 6B]
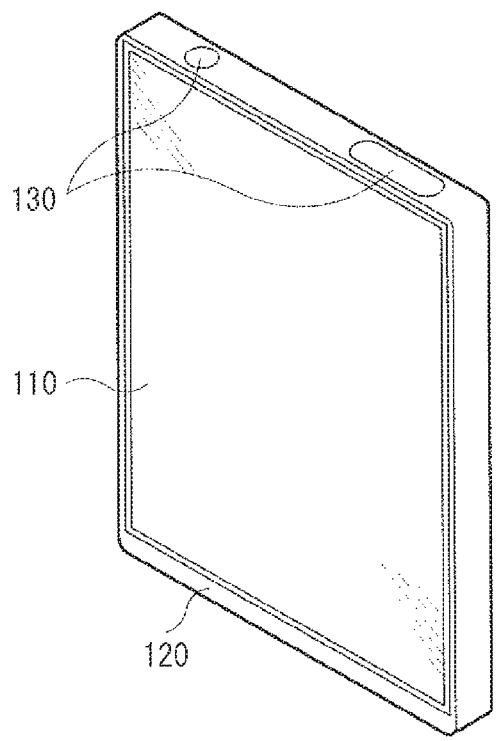

[Fig. 7]
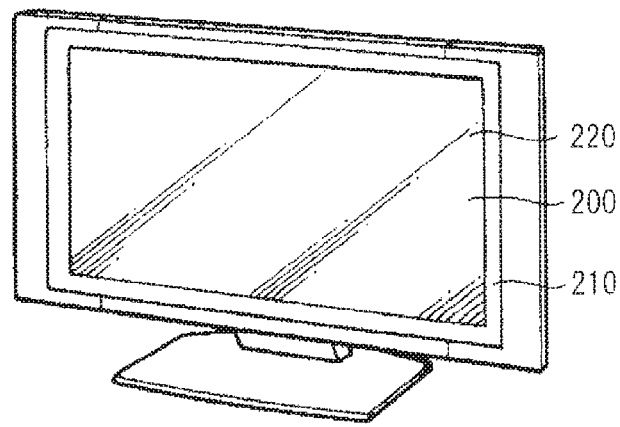
[Fig. 8]
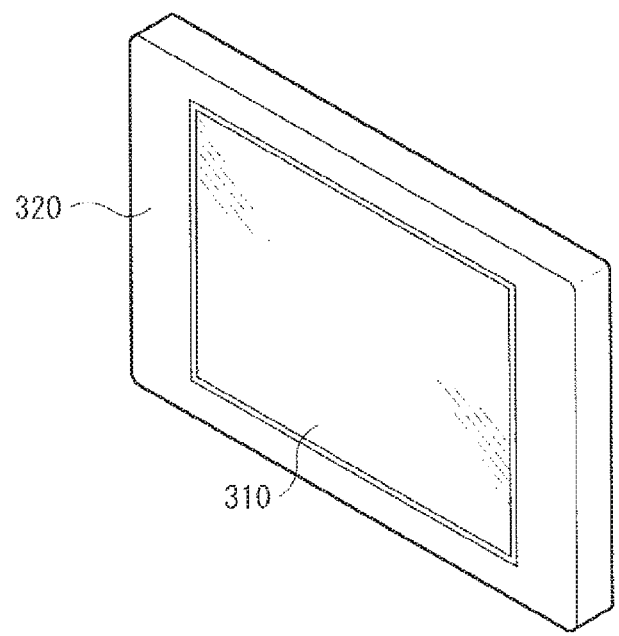
[Fig. 9A]
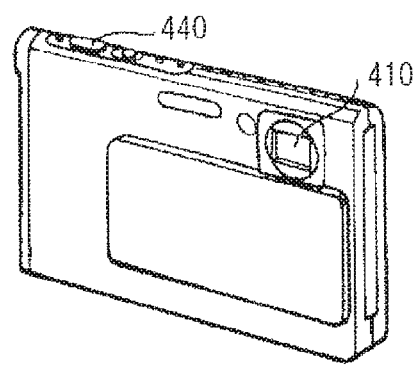

[Fig. 9B]
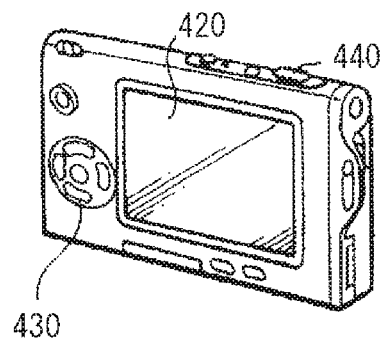
[Fig. 10]
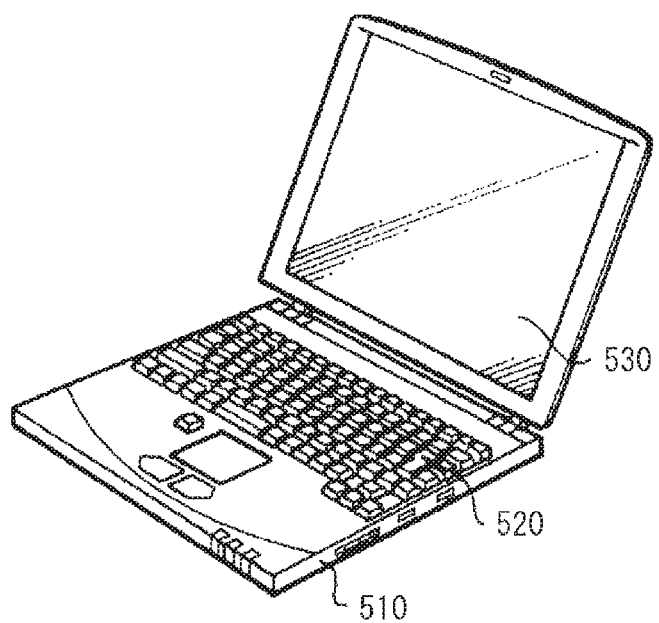

[Fig. 11]
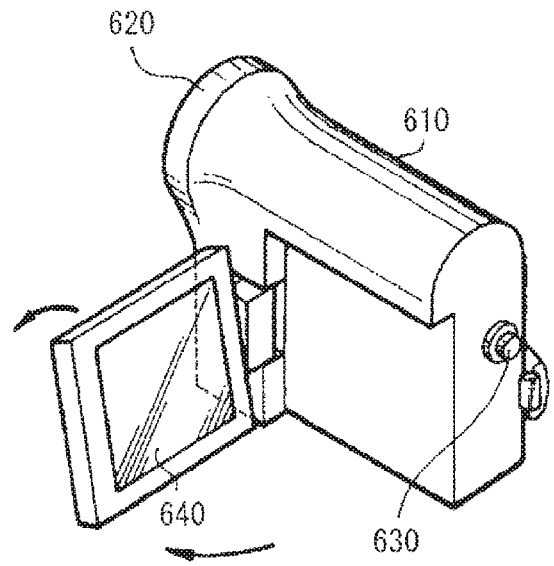
[Fig. 12A]
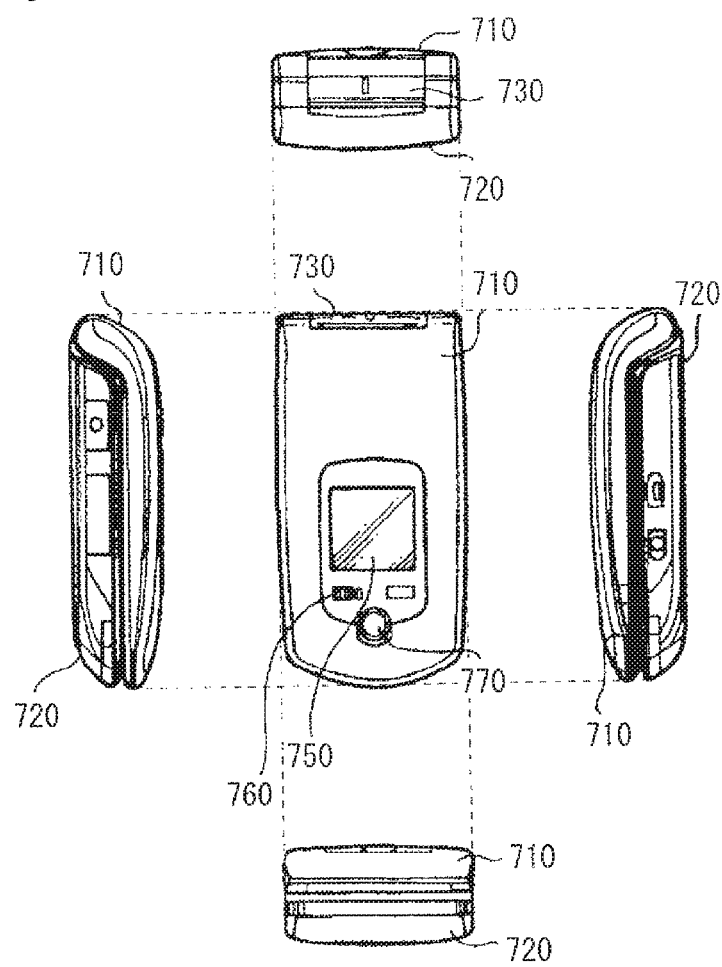

[Fig. 12B]
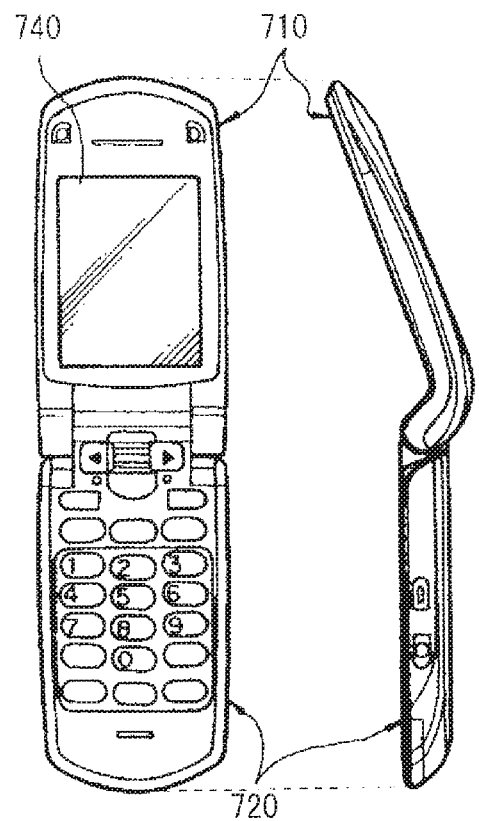

DISPLAY UNIT AND ELECTRONIC APPARATUS

CROSS REFERENCE TO RELATED APPLICATIONS

This application claims the benefit of Japanese Priority Patent Application JP 2013-131427 filed Jun. 24, 2013, the entire contents of which are incorporated herein by reference.

TECHNICAL FIELD

The present technology relates to a display unit and an electronic apparatus that include an electrophoretic element.

BACKGROUND ART

In recent years, low-power display units (displays) with high image quality have been in increasing demand, as mobile devices represented by mobile phones and portable information terminals have become widespread. In particular, distribution service of digital books has recently started, and a display having a display quality suitable for reading is desired.

Although displays such as a cholesteric liquid crystal display, an electrophoretic display, an electric-redox-type display, and a twisting ball display have been proposed as such displays, a reflection-type display is advantageous for reading. In the reflection-type display, bright display is performed with use of reflection (scattering) of external light in a manner similar to that of a paper and thus, display quality close to that of the paper is achieved.

Among the reflection-type displays, an electrophoretic display using electrophoresis phenomenon that is low in power consumption and high in response speed is expected to be a major display. As the display method, the following two methods have been mainly proposed.

In a first method, two kinds of charged particles are dispersed in an insulating liquid, and the charged particles are moved in response to an electric field. The two kinds of charged particles are different in optical reflection characteristics from each other, and its polarities are opposite to each other. In this method, a distribution state of the charged particles is changed in response to the electric field, and an image is displayed.

In a second method, charged particles are dispersed in an insulating liquid, and a porous layer is disposed (for example, PTL 1). In this method, the charged particles move through pores of the porous layer in response to the electric field. For example, the porous layer may include a fibrous structure formed of a polymer material and non-migrating particles held by the fibrous structure. For example, polyacrylonitrile having a cyano group high in polarity may be used for the fibrous structure.

CITATION LIST

Patent Literature

[PTL 1] JP 2012-22296

SUMMARY

Technical Problem

In the electrophoretic display having such a fibrous structure, moving speed of the charged particles through the pores, namely, response speed is desirably increased.

It is desirable to provide a display unit and an electronic apparatus each having high response speed.

Solution to Problem

According to an embodiment of the technology, there is provided a display unit including: in an insulating liquid, migrating particles; non-migrating particles having optical reflection characteristics different from optical reflection characteristics of the migrating particles; and a fibrous structure formed of a chain molecule and holding the non-migrating particles, the chain molecule containing an ester group and having a main part formed of carbon atoms, oxygen atoms, and hydrogen atoms.

According to an embodiment of the technology, there is provided an electronic apparatus provided with a display unit. The display unit includes: in an insulating liquid, migrating particles; non-migrating particles having optical reflection characteristics different from optical reflection characteristics of the migrating particles; and a fibrous structure formed of a chain molecule and holding the non-migrating particles, the chain molecule containing an ester group and having a main part formed of carbon atoms, oxygen atoms, and hydrogen atoms.

In the display unit according to the embodiment of the technology, the chain molecule is formed of carbon atoms, oxygen atoms, and hydrogen atoms. Therefore, for example, as compared with the case where the fibrous structure is formed of a polymer having a functional group high in polarity, such as a cyano group, an absolute value of a surface potential of the fibrous structure is small. As a result, balance of the charge in the insulating liquid is easily maintained.

Advantageous Effects of Invention

In the display unit and the electronic apparatus according to the respective embodiments of the technology, the absolute value of the surface potential of the fibrous structure is decreased. Therefore, it is possible to form an environment where the migrating particles easily move in the insulating liquid. Consequently, it is possible to improve response speed.

It is to be understood that both the foregoing general description and the following detailed description are exemplary, and are provided to provide further explanation of the technology as claimed.

BRIEF DESCRIPTION OF DRAWINGS

The accompanying drawings are included to provide a further understanding of the technology, and are incorporated in and constitute a part of this specification. The drawings illustrate embodiments and, together with the specification, serve to explain the principles of the technology.

FIG. 1 is a plan view illustrating a structure of an electrophoretic element according to an embodiment of the technology.

FIG. 2 is a sectional diagram illustrating a structure of the electrophoretic element illustrated in FIG. 1.

FIG. 3 is a plan view illustrating a structure of a main part of an electrophoretic element according to a modification.

FIG. 4 is a sectional diagram illustrating a structure of a display unit using the electrophoretic element of FIG. 1 and the like.

FIG. 5 is a sectional diagram for explaining operation of the display unit illustrated in FIG. 4.

FIG. 6A is a perspective view illustrating an appearance of an application example 1.

FIG. 6B is a perspective view illustrating another example of an electronic book illustrated in FIG. 6A.

FIG. 7 is a perspective view illustrating an appearance of an application example 2.

FIG. 8 is a perspective view illustrating an appearance of an application example 3.

FIG. 9A is a perspective view illustrating an appearance of an application example 4 as viewed from a front side thereof.

FIG. 9B is a perspective view illustrating the appearance of the application example 4 as viewed from a back side thereof.

FIG. 10 is a perspective view illustrating an appearance of an application example 5.

FIG. 11 is a perspective view illustrating an appearance of an application example 6.

FIG. 12A is a front view, a left side view, a right side view, and a top view of an application example 7 in a closed state.

FIG. 12B is a front view and a side view of the application example 7 in an open state.

DESCRIPTION OF EMBODIMENTS

Hereinafter, an embodiment of the technology will be described in detail with reference to drawings. Note that description will be given in the following order.
1. Embodiment (electrophoretic element)
2. Modification (electrophoretic element: an example in which non-migrating particles include large particles and small particles different in particle diameter from each other)
3. Application examples (display unit and electronic apparatus)
4. Examples
<Embodiment>

FIG. 1 illustrates a planer structure of an electrophoretic element (an electrophoretic element 11) according to an embodiment of the technology, and FIG. 2 illustrates a sectional structure of the electrophoretic element 11. The electrophoretic element 11 uses electrophoresis phenomenon to generate contrast, and may be applied to, for example, various electronic apparatuses such as a display unit. The electrophoretic element 11 includes migrating particles 10 and a porous layer 20 including pores 23 in an insulating liquid 1. Note that FIGS. 1 and 2 each schematically illustrate a structure of the electrophoretic element 11, and a dimension and a shape of the electrophoretic element 11 may be different from an actual dimension and an actual shape.

The insulating liquid 1 may be formed of, for example, an organic solvent such as paraffin and isoparaffin. One kind of organic solvent or a plurality of kinds of organic solvents may be used for the insulating liquid 1. Viscosity and a refractive index of the insulating liquid 1 may be desirably as small as possible. Mobility (response speed) of the migrating particles 10 is improved as the viscosity of the insulating liquid 1 is decreased. In addition, energy (consumed power) necessary for movement of the migrating particles 10 is accordingly decreased. When the refractive index of the insulating liquid 1 is decreased, a difference between the refractive index of the insulating liquid 1 and a refractive index of the porous layer 20 is increased, and reflectance of the porous layer 20 is increased.

For example, a coloring agent, a charge control agent, a dispersion stabilizer, a viscosity modifier, a surfactant, a resin, or the like may be added to the insulating liquid 1.

The migrating particles 10 dispersed in the insulating liquid 1 are one or two or more charged particles, and such charged migrating particles 10 move through pores 23 according to an electric field. The migrating particles 10 have arbitrary optical reflection characteristics (optical reflectance), and contrast occurs due to difference between the optical reflectance of the migrating particles 10 and the optical reflectance of the porous layer 20. For example, the migrating particles 10 may perform bright display and the porous layer 20 may perform dark display, or the migrating particles 10 may perform the dark display and the porous layer 20 may perform the bright display.

When the electrophoretic element 11 is viewed from the outside, the migrating particles 10 may be visually confirmed as, for example, white or a color close to white in the case where the migrating particles 10 perform the bright display, and may be visually confirmed as, for example, black or a color close to block in the case where the migrating particles 10 perform the dark display. The color of the migrating particles 10 is not particularly limited as long as the contrast occurs.

For example, the migrating particles 10 may be formed of particles (powder) of an organic pigment, an inorganic pigment, a dye, a carbon material, a metallic material, a metal oxide, glass, and a polymer material (a resin). One kind or two or more kinds thereof may be used for the migrating particles 10. The migrating particles 10 may be formed of crushed particles or capsule particles of a resin solid content containing the above-described particles. Note that materials equivalent to the above-listed carbon material, metallic material, metal oxide, glass, and polymer material are excluded from materials equivalent to the above-mentioned organic pigment, inorganic pigment, and dye. The particle diameter of each of the migrating particles 10 may be, for example, about 30 nm to about 300 nm both inclusive.

Examples of the organic pigment may include azo pigments, metal complex azo pigments, polycondensation azo pigments, flavanthrone pigments, benzimidazolone pigments, phthalocyanine pigments, quinacridone pigments, anthraquinone pigments, perylene pigments, perinone pigments, anthrapyridine pigments, pyranthrone pigments, dioxazine pigments, thioindigo pigments, isoindolinone pigments, quinophthalone pigments, and indanthrene pigments. Examples of the inorganic pigment may include zinc oxide (e.g. zinc flower and zinc white), antimony white, black iron oxide, titanium boride, red iron oxide, mapico yellow, minium, cadmium yellow, zinc sulphide, lithopone, barium monosulfide, cadmium selenide, calcium carbonate, barium sulfate, lead chromate, lead sulfate, barium carbonate, white lead, and alumina white. Examples of the dye may include nigrosine dyes, azo dyes, phthalocyanine dyes, quinophthalone dyes, anthraquinone dyes, and methine dyes. Examples of the carbon material may include carbon black. Examples of the metallic material may include gold, silver, and copper. Examples of the metal oxide may include titanium oxide, zinc oxide, zirconium oxide, barium titanate, potassium titanate, copper-chromium oxide, copper-manganese oxide, copper-iron-manganese oxide, copper-chromium-manganese oxide, and copper-iron-chromium oxide. Examples of the polymer material may include a high molecular compound into which a functional group having an optical absorption range in a visible light region is introduced. The kind of the polymer material is not particularly limited as long as such a high molecular compound having the optical absorption range in the visible light region is adopted.

A specific material of the migrating particles 10 may be selected according to a role of the migrating particles 10 to generate contrast, for example. When the migrating particles 10 perform the bright display, for example, a metal oxide such as titanium oxide, zinc oxide, zirconium oxide, barium titanate, and potassium titanate, or the like may be used for the migrating particles 10. When the migrating particles 10 perform the dark display, for example, a carbon material such as carbon black, or a metal oxide such as copper-chromium oxide, copper-manganese oxide, copper-iron-manganese oxide, copper-chromium-manganese oxide, and copper-iron-chromium oxide, or the like may be used for the migrating particles 10. Among them, a carbon material may be preferably used for the migrating particles 10. The migrating particles 10 formed of the carbon material exhibit excellent chemical stability, excellent mobility, and excellent light absorption property.

The content (density) of the migrating particles 10 in the insulating liquid 1 may be, for example, about 0.1 wt % to about 10 wt % both inclusive, although it is not particularly limited. A shielding property and mobility of the migrating particles 10 are secured in this density range. Specifically, when the content of the migrating particles 10 is lower than 0.1 wt %, it may be difficult for the migrating particles 10 to shield (hide) the porous layer 20, and contrast may not be sufficiently generated. On the other hand, when the content of the migrating particles 10 is higher than 10 wt %, dispersibility of the migrating particles 10 may decrease. Therefore, the migrating particles 10 are difficult to migrate, which leads to a possibility of occurrence of agglomeration in some cases.

The migrating particles 10 may be preferably readily dispersed and charged in the insulating liquid 1 for a long time, and may be less easily adsorbed on the porous layer 20. Therefore, for example, a dispersant may be added to the insulating liquid 1. The dispersant and the charge control agent may be used together.

For example, the dispersant or the charge control agent may have one or both of positive charge and negative charge, and increase charged amount in the insulating liquid 1 as well as disperse the migrating particles 10 by electrostatic repulsion. Examples of such a dispersant may include Solsperce series made by The Lubrizol Corporation, BYK series or Anti-Terra series made by BYK-Chemic GmbH, and Span series made by TCI Americas Inc.

To improve dispersibility of the migrating particles 10, surface treatment may be performed on the migrating particles 10. Examples of the surface treatment may include rosin treatment, surfactant treatment, pigment derivative treatment, coupling agent treatment, graft polymerization treatment, and microencapsulation treatment. Among them, performing the graft polymerization treatment, the microencapsulation treatment, or a combination of these treatments makes it possible to maintain long-term dispersion stability of the migrating particles 10.

For example, a material (an adsorptive material) that contains a functional group capable of being adsorbed on the surface of the migrating particles 10 and a polymeric functional group may be used in such surface treatment. The kind of the functional group capable of being adsorbed is determined depending on the material of the migrating particles 10. For example, when the migrating particles 10 are formed of a carbon material such as carbon black, an aniline derivative such as 4-vinyl aniline may be absorbed. When the migrating particles 10 are formed of a metal oxide, an organosilane derivative such as methacrylate-3-(trimethoxysilyl)propyl may be absorbed. Examples of the polymeric functional group may include a vinyl group, an acrylic group, and a methacryl group.

A polymeric functional group may be introduced on the surface of the migrating particles 10, and a material may be grafted thereon to perform the surface treatment (a graft material). For example, the graft material may contain a polymeric functional group and a functional group for dispersion. The functional group for dispersion is capable of dispersing the migrating particles 10 in the insulating liquid 1 and maintaining dispersibility by steric hindrance. When the insulating liquid 1 may be, for example, paraffin, a branched-alkyl group or the like may be used as the functional group for dispersion. Examples of the polymeric functional group may include a vinyl group, an acryl group, and a methacryl group. To cause polymerization and graft of the graft material, for example, a polymerization initiator such as azobisisobutyronitrile (AIBN) may be used.

Details of a method of dispersing the migrating particles 10 in the insulating liquid 1 as described above are described in books such as "Dispersion technology of ultrafine particles and evaluation thereof: surface treatment and fine grinding, as well as dispersion stability in air/liquid/polymer (Science & Technology Co., Ltd.)".

The porous layer 20 is capable of shielding the migrating particles 10, and has a fibrous structure 21 and non-migrating particles 22 held by the fibrous structure 21. The porous layer 20 is a three-dimensional structure (an irregular network structure such as a non-woven fabric) formed of the fibrous structure 21, and is provided with a plurality of apertures (pores 23). Forming the three-dimensional structure of the porous layer 20 by the fibrous structure 21, which allows light (outside light) to be reflected irregularly (multiply scattered), and increases the reflectance of the porous layer 20. Accordingly, even when the thickness of the porous layer 20 is small, high reflectance is allowed to be obtained, and the contrast of the electrophoretic element 11 is allowed to be improved as well as energy necessary for movement of the migrating particles 10 is allowed to be decreased. Moreover, the average pore diameter of the pores 23 becomes large, and a lot of pores 23 are provided in the porous layer 20. Accordingly, the migrating particles 10 are easily moved through the pores 23, the response speed is increased, and the energy necessary for movement of the migrating particles 10 is more decreased. The thickness of such a porous layer 20 may be, for example, about 5 μm to about 100 μm both inclusive.

The fibrous structure 21 is a fibrous substance having a length sufficient with respect to a fiber diameter. For example, a plurality of fibrous structures 21 may be collected and randomly overlapped to form the porous layer 20. One fibrous structure 21 may be randomly tangled to form the porous layer 20. Alternatively, the porous layer 20 formed of one fibrous structure 21 and the porous layer 20 formed of a plurality of fibrous structures 21 may be mixed.

In the present embodiment, a main part of a molecule forming the fibrous structure 21, namely, a main framework is formed of carbon atoms, oxygen atoms, and hydrogen atoms. In other words, the main framework of the molecule does not contain atoms other than the carbon atoms, the oxygen atoms, and the hydrogen atoms, and is formed of only these atoms. Such a molecule forming the fibrous structure 21 may not preferably contain a functional group high in polarity, such as a hydroxyl group and a carboxylic acid group. Although details will be described later, this allows an absolute value of a surface potential of the fibrous structure 21 to be decreased, and allows the response speed of the electrophoretic element 11 to be improved. In this case, the main framework indicates a part excluding both terminals of the molecule. The molecule forming the fibrous structure 21 may be preferably formed of carbon atoms, oxygen atoms, and hydrogen atoms over both terminals; however the terminal may contain atoms other than carbon atoms, oxygen atoms and hydrogen atoms. For example, when the polymer is synthesized through radical polymerization, a polymerization initiator such as azobisisobutyronitrile (AIBN) may be used as a catalyst. Although both terminals of the polymer thus synthesized each include nitrogen atoms and the like, molecular weight of the atoms at the terminals is smaller than one thousandth of whole molecule. Therefore, the atoms at the terminals less contribute to the characteristics of the molecule. The same applies to a polymerization initiator other than AIBN.

The molecule forming the fibrous structure 21 is a chain polymer. Here, the chain polymer indicates a polymer not including a cyclic atomic arrangement structure. Examples of the cyclic atomic arrangement may include a homocyclic compound and a heterocyclic compound. The homocyclic compound is formed of a single element, and specific examples thereof may include aromatic compounds, cycloalkene, cycloalkane, and cycloalkyne. The heterocyclic compound is formed of two or more kinds of elements, and specific examples thereof may include pyrrole, carbazole, cyclic acetal, pyran, furane, and thiophene. The chain molecule may be straight or branched.

The chain molecule forming the fibrous structure 21 contains an ester group. For example, the fibrous structure 21 may be preferably formed of an acrylic resin. Specific examples of the chain molecule may include polyalkylmethacrylate, polyalkylacrylate, polyalkenylmethacrylate, polyalkenylacrylate, polyalkynylmethacrylate, and polyalkynylacrylate. The chain molecule does not contain a functional group higher in polarity than an ester group, and the absolute value of the surface potential of the fibrous structure 21 may be, for example, about 20 mV or lower. The chain molecule may be preferably selected so that the absolute value of the surface potential of the fibrous structure 21 is about 10 mV or lower.

A material resistant to decomposition by microorganisms may be preferably used for the chain molecule forming the fibrous structure 21. In other words, the chain molecule may preferably have resistance to biodegradation. Examples of a polymer having biodegradability may include polyactate, polyvinyl alcohol, cellulose acetate, collagen, gelatin, and chitosan. Such a polymer may not maintain the characteristics of the fibrous structure when the electrophoretic element is subjected to any stimulation from the outside, because such a polymer is easily subjected to degradation. In addition, many of such polymers have water soluble property, and therefore, there is a possibility that the polymers are dissolved by moisture in the electrophoretic element and are not allowed to maintain the shape of the fibrous structure. In contrast, when the fibrous structure 21 is formed of the chain molecule having resistance to biodegradation, the stability of the fibrous structure 21 is increased. Therefore, it is possible to improve reliability of the electrophoretic element 11. The surface of the fibrous structure 21 may be covered with an arbitrary protection layer.

For example, the fibrous structure 21 may straightly extend. The fibrous structure 21 may have any shape, and for example, may be frizzled or folded halfway. Alternatively, the fibrous structure 21 may be branched halfway.

The average fiber diameter of the fibrous structure 21 may be, for example, about 50 nm or more and about 2000 nm or lower, and may be out of the above-described range. As the average fiber diameter is decreased, light is easily reflected irregularly, and the pore diameter of the pore 23 is increased. The fiber diameter is determined so that the fibrous structure 21 holds the non-migrating particles 22. For example, the average fiber diameter may be determined through microscope observation using a scanning electron microscope or the like. The average length of the fibrous structure 21 is arbitrary. For example, the fibrous structure 21 may be formed by a phase separation method, a phase inversion method, an electrostatic (electric field) spinning method, a melt spinning method, a wet spinning method, a dry spinning method, a gel spinning method, a sol-gel method, a spray applying method, or the like. Using such methods makes it possible to easily and stably form the fibrous structure 21 that has a sufficient length with respect to the fiber diameter.

The fibrous structure 21 may be preferably formed of nanofibers. The nanofiber is a fibrous substance having a fiber diameter of about 1 nm to about 1000 nm both inclusive and a length hundred times or more larger than the fiber diameter. Using such a nanofiber as the fibrous structure 21 allows light to be easily reflected irregularly, and makes it possible to improve the reflectance of the porous layer 20. In other words, it is possible to improve the contrast of the electrophoretic element 11. In addition, in the fibrous structure 21 formed of the nanofiber, the percentage of the pores 23 per unit volume is increased, and the migrating particles 10 easily move through the pores 23. Therefore, it is possible to decrease the energy necessary for movement of the migrating particles 10. The fibrous structure 21 formed of the nanofibers may be preferably formed by the electrostatic spinning method. Using the electrostatic spinning method makes it possible to easily and stably form the fibrous structure 21 having a small fiber diameter.

The fibrous structure 21 may preferably have an optical reflectance different from that of the migrating particles 10. Therefore, the contrast by a difference between the optical reflectance of the porous layer 20 and the optical reflectance of the migrating particles 10 is easily formed. The fibrous structure 21 exhibiting optical transparency (clear and colorless) in the insulating liquid 1 may be used.

The pores 23 are formed by the plurality of overlapped fibrous structures or one tangled fibrous structure 21. The pores 23 may preferably have an average pore diameter as large as possible so as to facilitate movement of the migrating particles 10 through the pores 23. The average pore diameter of the pores 23 may be, for example, about 0.1 to about 10 μm both inclusive.

The non-migrating particles 22 are one or two or more particles that are fixed to the fibrous structure 21 and do not perform electrophoresis. The non-migrating particles 22 may be embedded in the inside of the fibrous structure 21 holding the non-migrating particles 22, or may be partially exposed from the fibrous structure 21.

The non-migrating particles 22 have optical reflectance different from the optical reflectance of the migrating particles 10. The non-migrating particles 22 may be formed of the material similar to the material of the migrating particles 10. More specifically, when the non-migrating particles 22 (the porous layer 20) perform the bright display, the above-described material in the case where the migrating particles 10 perform the bright display may be used. When the non-migrating particles 22 perform the dark display, the above-described material in the case where the migrating particles 10 perform the dark display may be used. When the bright display is performed by the porous layer 20, the non-migrating particles 22 may be preferably formed of a metal oxide. As a result, it is possible to obtain excellent chemical stability, excellent fixity, and excellent optical reflectivity. The material of the non-migrating particles 22 and the material of the migrating particles 10 may be the same as each other or may be different from each other. The color visually confirmed from the outside at the time when the non-migrating particles 22 perform the bright display or the dark display is similar to those in description about the migrating particles 10 described above.

For example, such a porous layer 20 may be formed by the following methods. First, the material of the fibrous structure 21 such as polymer material is dissolved in an organic solvent or the like, to prepare a spinning solution. Then, the non-migrating particles 22 are added to the spinning solution, and the resultant solution is sufficiently stirred to disperse the non-migrating particles 22. Finally, spinning is performed from the spinning solution by, for example, the electrostatic spinning method to fix the non-migrating particles 22 to the fibrous structure 21, and the porous layer 20 is formed. In the porous layer 20, boring may be performed on a polymer film with use of a laser to form the pores 23, or a fabric woven of synthetic fibers and the like, open cell porous polymer, or the like may be used for the porous layer 20.

The electrophoretic element 11 generates contrast with use of the difference between the optical reflectance of the migrating particles 10 and the optical reflectance of the porous layer 20 as described above. Specifically, the optical reflectance of one of the migrating particles 10 and the porous layer 20 that performs the bright display is higher than the optical reflectance of the other that performs the dark display. The optical reflectance of the non-migrating particles 22 is set to be higher than that of the migrating particles 10, and the bright display may be preferably performed by the porous layer 20 and the dark display may be preferably performed by the migrating particles 10. Performing such display allows the optical reflectance in performing the dark display to be remarkably increased with use of light irregular reflection by the porous layer 20 (the three-dimensional structure). Therefore, the contrast is remarkably improved accordingly.

In the electrophoretic element 11, the migrating particles 10 move through the pores 23 of the porous layer 20 within an electric-field applied range. One of the bright display or the dark display is performed depending on the region where the migrating particles move and the region where the migrating particles do not move, and an image is displayed. In this case, since the molecule forming the fibrous structure 21 is formed of carbon atoms, oxygen atoms, and hydrogen atoms, the absolute value of the surface potential of the fibrous structure 21 is decreased, and the response speed of the electrophoretic element 11 is improved. Description thereof will be given below.

The absolute value of the surface potential of the fibrous structure that is formed of a molecule containing atoms other than carbon atoms, oxygen atoms, and hydrogen atoms, for example, a molecule containing nitrogen atoms, chlorine atoms, fluorine atoms, bromine atoms, iodine atoms, phosphorus atoms, or sulfur atoms, is easily increased. This is because there is a high possibility that the molecule containing such atoms has a functional group high in polarity, for example, an amid group, an imide group, a cyano group, a sulphonyl group, an amino group, a nitro group, a thiol group, a halogen compound, an urethane bond, and the like.

Specifically, examples of the polymer including a functional group high in polarity described above may include nylon, polyamide, polyimide, polyacrylonitrile, polyvinyl chloride, polyvinylidene fluoride, polyhexafluoropropylene, polyurethane, and polysulfone. The fibrous structure having large absolute value of the surface potential easily disrupts balance of charge in the insulating liquid. For example, there is a possibility that the dispersant in the insulating liquid is attracted to the fibrous structure, and does not function as the dispersant to maintain the dispersion state of the migrating particles. As a result, the dispersion state of the migrating particles is degraded, and the response speed of the electrophoretic element is lowered.

It is conceivable that the dispersant is excessively added to increase the response speed of the electrophoretic element. Even in this case, however, it is difficult to maintain the dispersion state of the migrating particles in the insulating liquid in the long term, and it is difficult to secure reliability of the electrophoretic element.

Moreover, a functional group high in polarity has high reactivity in many cases. Therefore, the fibrous structure is denatured in the electrophoretic element due to external stimulation such as light irradiation, which may cause degradation in reliability.

In contrast, in the electrophoretic element 11, the molecule forming the fibrous structure 21 is formed of only carbon atoms, oxygen atoms, and hydrogen atoms. Accordingly, the absolute value of the surface potential of the fibrous structures 21 is decreased, and the balance of charge in the insulating liquid is maintained. For example, the dispersant and the like are difficult to be attracted to the fibrous structure 21. Therefore, the added dispersant functions to assist movement of the migrating particles 10. In other words, an environment in which the migrating particles 10 easily moves is formed in the insulating liquid 1, and the response speed of the electrophoretic element 11 is improved. Moreover, since it is unnecessary to excessively add the dispersant, the reliability becomes high and its cost is allowed to be suppressed.

In addition, since the reactivity of the fibrous structure 21 that is formed of only carbon atoms, oxygen atoms, and hydrogen atoms is low, the fibrous structure 21 stably exists in the insulating liquid 1. Accordingly, high reliability is obtained in the electrophoretic element 11.

Furthermore, since the fibrous structure 21 is formed of the chain molecule, steric hindrance is smaller than that of a molecule containing a cyclic structure such as polyethylene terephthalate, polyvinyl carbazole, polystyrene, and polyvinylpyrrolidone. Therefore, the migrating particles 10 easily move and the contrast and the response speed of the electrophoretic element 11 are improved.

Moreover, since the molecule forming the fibrous structure 21 contains an ester group, polarity derived from the ester group exists in the molecule. The polarity of the ester group is smaller than that of the above-described cyano group and the like; however is sufficient for spinning using the electric field spinning method. Thus, the fibrous structure 21 is easily formed by the electric field spinning method.

As described above, in the electrophoretic element 11 according to the present embodiment, since the molecule forming the fibrous structure 21 is formed of carbon atoms, oxygen atoms, and hydrogen atoms, it is possible to increase the response speed of the electrophoretic element 11.

Moreover, an excessive amount of dispersant and the like is unnecessary, and high reliability is allowed to be obtained.

Hereinafter, although a modification of the above-described embodiment will be described, like numerals are used to designate substantially like components of the above-described embodiment, and the description thereof is appropriately omitted.

<Modification>

FIG. 3 schematically illustrates a planar structure of a porous layer (a porous layer 20A) of an electrophoretic element (an electrophoretic element 11A) according to a modification. The non-migrating particles 22 in the porous layer 20A include particles different in primary particle diameter from one another (large particles 22L and small particles 22S). In this case, the primary particle diameter indicates a minimum particle diameter of each of the large particles 22L and the small particles 22S, and for example, when the particles are aggregated or bonded from one another, the primary particle diameter indicates a particle diameter of individual particles. Except for this point, the electrophoretic element 11A has a structure similar to that of the electrophoretic element 11, and a function and effects of the electrophoretic element 11A are similar to those of the electrophoretic element 11.

A particle diameter DS of each of the small particles 22S may be preferably adjusted based on optical characteristics necessary for the non-migrating particles 22. For example, when the porous layer 20A (the non-migrating particles 22) performs the bright display, the particle diameter DS of each of the small particles 22S is determined so that the small particles 22S have high optical reflectance. For example, when the porous layer 20A (the non-migrating particles 22) performs the dark display, the particle diameter DS of each of the small particles 22S is determined so that the small particles 22S have low optical reflectance. When the bright display is performed by the porous layer 20A, the particle diameter DS of each of the small particles 22S is lower than about 400 nm, for example, may be about 100 nm to about 350 nm both inclusive, and preferably about 200 nm to about 300 nm both inclusive. In the range of the particle diameter DS of the small particles 22S, the optical scattering efficiency of visible light region is the highest by Mie scattering theory, and the optical reflectance of the non-migrating particles 22 is improved.

The large particles 22L are to increase a volume occupied by the non-migrating particles 22 in the insulating liquid 1, and to decrease the optical transmittance. Accordingly, the non-migrating particles 22 are allowed to efficiently cover the migrating particles 10. Therefore, it is possible to improve concealment ratio of the migrating particles 10. A particle diameter DL of each of the large particles 22L is larger than the particle diameter DS of each of the small particles 22S, and for example, may be preferably two to ten times larger than the particle diameter DS of each of the small particles 22S. For example, the particle diameter DL of each of the large particles 22L may be about 400 nm or larger, and preferably about 400 nm to about 1000 nm both inclusive, and more preferably about 400 nm to about 700 nm both inclusive. When the particle diameter DL exceeds 1000 nm, the large particles 22L may inhibit movement of the migrating particles 10.

The non-migrating particles 22 may preferably have a larger amount of the small particles 22S than that of the large particles 22L in weight ratio (wt %). For example, a weight ratio of the large particles 22L in the non-migrating particles 22 may be preferably lower than 40 wt %. When a large amount of the small particles 22S are included, it is possible to improve optical characteristics of the non-migrating particles 22 based on, for example, Mie scattering theory. Moreover, since a moving path of the migrating particles 10 is secured, the response speed of the electrophoretic element 11A is maintained. The weight ratio of the small particles 22S and the large particles 22L, and the particle diameter DS of the small particles 22S and the particle diameter DL of the large particles 22L are allowed to be confirmed by, for example, a scanning type microscope. The material of the small particles 22S and the material of the large particles 22L may be the same as each other or may be different from each other.

As described above, the non-migrating particles 22 include the large particles 22L and the small particles 22S that are different in primary particle size from each other, which makes it possible to maintain the optical characteristics of the non-migrating particles by the small particles 22S and to effectively shield the migrating particles 10 by the large particles 22L. For example, in the case where the bright display is performed by the porous layer 20A and the dark display is performed by the migrating particles 10, in the electrophoretic element 11A, in the bright display, the migrating particles 10 are covered with the non-migrating particles 22 over a region wider than that in the case where the non-migrating particles 22 are formed of only the small particles 22S. In other words, the migrating particles 10 are allowed to be efficiently hidden. Therefore, the optical reflectance of the bright display is improved in the electrophoretic element 11A. The same applies to the case where the dark display is performed by the porous layer 20A and the bright display is performed by the migrating particles 10.

APPLICATION EXAMPLES (Display Unit)

Next, application examples of the above-described electrophoretic elements 11 and 11A will be described. For example, the electrophoretic elements 11 and 11A may be applied to a display unit.

FIG. 4 illustrates an example of a sectional structure of a display unit (a display unit 3) using the electrophoretic element 11 or 11A. The display unit 3 is an electrophoretic display (so-called electronic paper display) that displays an image (for example, character information) with use of electrophoresis phenomenon, and has the electrophoretic element 11 or 11A between a drive substrate 30 and an opposing substrate 40. A spacer 60 adjusts a distance between the drive substrate 30 and the opposing substrate 40 to a predetermined distance.

The drive substrates may include, for example, thin film transistors (TFTs) 32, a protection layer 33, a planarizing insulating layer 34, and pixel electrodes 35 in this order on one surface of a plate member 31. For example, the TFTs 32 and the pixel electrodes 35 may be arranged in a matrix form or in a segment form depending on pixel arrangement.

For example, the plate member 31 may be formed of an inorganic material, a metallic material, a plastic material, or the like. Examples of the inorganic material may include silicon (Si), silicon oxide ($SiO_x$), silicon nitride ($SiN_x$), and aluminum oxide ($AlO_x$). Examples of the silicon oxide may include glass and spin on glass (SOG). Examples of the metallic material may include aluminum (Al), nickel (Ni), and stainless steel. Examples of the plastic material may include polycarbonate (PC), polyethylene terephthalate (PET), polyethylene naphthalate (PEN), and polyethylether ketone (PEEK).

In the display unit 3, an image is displayed on a side close to the opposing substrate 40, and thus the planar member 31 may have non-optical transparency. The plate member 31 may be configured of a substrate having rigidity such as wafer, or may be configured of a thin layer glass, a film, or the like having flexibility. Using a flexible material for the plate member 31 makes it possible to realize flexible (foldable) display unit 3.

The TFTs 32 are switching elements to select pixels. The TFTs 32 may be inorganic TFTs using an inorganic semiconductor layer as a channel layer, or organic TFTs using an organic semiconductor layer. For example, the protection layer 33 and the planarizing insulating layer 34 may be formed of an insulating resin material such as polyimide. If the surface of the protection layer 33 is sufficiently flat, the planarizing insulating layer 34 may be omitted. For example, the pixel electrodes 35 may be formed of a metallic material such as gold (Au), silver (Ag), and copper (Cu). The pixel electrodes 35 are connected to the TFTs 32 through contact holes (not illustrated) that are provided in the protection layer 33 and the planarizing insulating layer 34.

For example, the opposing substrate 40 may have a plate member 41 and opposing electrodes 42, and the opposing electrodes 42 are provided on an entire surface (a surface opposed to the drive substrate 30) of the plate member 41. The opposing electrodes 42 may be arranged in a matrix form or in a segment form, as with the pixel electrodes 32.

The plate member 41 is formed of a material similar to that of the plate member 31, except for having optical transparency. For example, a translucent conductive material (a transparent electrode material) such as indium tin oxide (ITO), antimony tin oxide (ATO), fluorine doped tin oxide (FTO), and aluminum doped zinc oxide (AZO) may be used for the opposing electrodes 42.

When an image is displayed on a side close to the opposing substrate 40, the electrophoretic element 11 is viewed through the opposing electrodes 42. Therefore, the optical transparency (transmittance) of the opposing electrodes 42 may be preferably as high as possible, and for example, may be about 80% or more. Moreover, the electric resistance of the opposing electrodes 42 may be preferably as low as possible, and for example, may be about 100 Ω/sq. or lower.

The electrophoretic elements 11 and 11A in the present application example have a structure similar to those of the electrophoretic elements 11 and 11A according to the above-described embodiment and modification, respectively. Specifically, the electrophoretic elements 11 and 11A include the migrating particles 10 and the porous layers 20 and 20A including the plurality of pores 23 in the insulating liquid 1, respectively. The insulating liquid 1 is filled in a space between the drive substrate 30 and the opposing substrate 40, and the porous layer 20 or 20A may be supported by, for example, a spacer 60. The space where the insulating liquid 1 is filled may be segmented into a waiting region R1 on a side close to the pixel electrodes 35 and a display region R2 on a side close to the opposing electrodes 42 with the porous layer 20 or 20A as a border. The structures of the insulating liquid 1, the migrating particles 10, and the porous layers 20 and 20A are similar to those described in the above-described embodiment and the like. Note that, in FIG. 4 and FIG. 5 described later, a part of the pores 23 is illustrated for simplification of illustration contents.

The porous layers 20 and 20A may be adjacent to one of the pixel electrodes 35 and the opposing electrodes 42, and may not be clearly segmented into the waiting region R1 and the display region R2. The migrating particles 10 move toward the pixel electrodes 35 or the opposing electrodes 42 according to the electric field.

A thickness of the spacer 60 may be, for example, about 10 μm to 100 μm, and preferably as thin as possible. As a result, power consumption is allowed to be suppressed. For example, the spacer 60 may be formed of an insulating material such as a polymer material, and may be provided, for example, in a lattice shape between the drive substrate 30 and the opposing substrate 40. The arrangement shape of the spacer 60 is not particularly limited, and may be preferably provided so as not to prevent the movement of the migrating particles 10 and to allow the migrating particles 10 to be uniformly distributed.

In the display unit 3 in the initial state, the migrating particles 10 are disposed in the waiting region R1 (FIG. 4). In this case, the migrating particles 10 are shielded by the porous layer 20 or 20A in all of the pixels. Therefore, contrast is not generated (an image is not displayed) when the electrophoretic element 11 or 11A is viewed from the opposing substrate 40 side.

On the other hand, when the pixels are selected by the TFTs 32 and an electric field is applied between the pixel electrodes 35 and the opposing electrode 42, as illustrated in FIG. 5, the migrating particles 10 move from the waiting region R1 to the display region R2 through the porous layer 20 or 20A (the pores 23) for each pixel. In this case, pixels in which the migrating particles 10 are shielded by the porous layer 20 or 20A and pixels in which the migrating particles 10 are not shielded by the porous layer 20 or 20A exist together. Therefore, when the electrophoretic element 11 or 11A is viewed from the opposing substrate 40 side, the contrast is generated. As a result, an image is displayed.

According to the display unit 3, for example, high-quality images suitable for colorization and moving picture display are allowed to be displayed by the electrophoretic element 11 or 11A having high response speed.

(Electronic Apparatus)

Next, application examples of the above-described display unit 3 will be described.

The display unit 3 according to the present technology is applicable to electronic apparatuses for various purposes, and kinds of the electronic apparatuses are not particularly limited. For example, the display unit 3 is capable of being mounted on the following electronic apparatuses. However, configurations of the electronic apparatuses described below are merely examples, and thus the configurations are appropriately modified.

Application Example 1

FIGS. 6A and 6B each illustrate an appearance configuration of an electronic book. For example, the electronic book may include a display section 110, a non-display section 120, and an operation section 130. Note that the operation section 130 may be provided on a front surface of the non-display section 120 as illustrated in FIG. 6A or may be provided on a top surface as illustrated in FIG. 6B. The display section 110 is configured of the display unit 3. Note that, the display unit 3 may be mounted on a personal digital assistants (PDA) having a configuration similar to that of the electronic book illustrated in FIGS. 6A and 6B.

Application Example 2

FIG. 7 illustrates an appearance configuration of a television. For example, the television may include a picture display screen section 200 including a front panel 210 and a filter glass 220. The picture display screen section 200 is configured of the display unit 3.

Application Example 3

FIG. 8 illustrates an appearance configuration of a tablet personal computer. For example, the tablet personal computer may include a touch panel section 310 and a housing 320, and the touch panel section 310 is configured of the above-described display unit 3.

Application Example 4

FIGS. 9A and 9B each illustrate an appearance configuration of a digital still camera, where FIG. 9A illustrates a front surface and FIG. 9B illustrates a back surface. For example, the digital still camera may include a light emitting section 410 for flash, a display section 420, a menu switch 430, and a shutter button 440. The display section 420 is configured of the display unit 3.

Application Example 5

FIG. 10 illustrates an appearance configuration of a notebook personal computer. For example, the notebook personal computer may include a main body 510, a keyboard 520 for input operation of characters and the like, and a display section 530 displaying an image. The display section 530 is configured of the display unit 3.

Application Example 6

FIG. 11 illustrates an appearance configuration of a video camera. For example, the video camera may include a main body section 610, an object-shooting lens 620 provided on a front surface of the main body section 610, a start-stop switch 630 for shooting, and a display section 640. The display section 640 is configured of the display unit 3.

Application Example 7

FIGS. 12A and 12B each illustrate an appearance configuration of a mobile phone. FIG. 12A illustrates a front surface, a left side surface, a right side surface, a top surface, and a bottom surface of the mobile phone in a closed state, and FIG. 12B illustrates a front surface and a side surface of the mobile phone in an open state. For example, the mobile phone may be configured by connecting an upper housing 710 and a lower housing 720 with a connection section (a hinge section) 730, and may include a display 740, a sub-display 750, a picture light 760, and a camera 770.

EXAMPLES

Next, examples of the present technology will be described in detail.

Experimental Example 1

A display unit was fabricated by the following procedure with use of black (dark display) migrating particles and a white (bright display) porous layer (particle-containing fibrous structure).

First, after 42.624 g of sodium hydroxide and 0.369 g of sodium silicate were dissolved in 43 g of water, 5 g of complex oxide fine particles (oxide of copper, iron, and manganese, DAIPYROXIDE Color TM3550 made by Dainichiseika Color & Chemicals Mfg. Co., Ltd.) was added while the solution was stirred. After the solution was stirred for 15 minutes, supersonic wave stirring (at about 30° C. to about 35° C., for 15 minutes) was performed. Then, the complex oxide fine particles dispersed liquid was heated at 90° C., followed by dropping, for two hours, of 15 $cm^3$ (=mL) of 0.22 $mol/cm^3$ sulfuric acid and 7.5 $cm^3$ of water solution in which 6.5 mg of sodium silicate and 1.3 mg of sodium hydroxide were dissolved. Subsequently, the solution was cooled to room temperature, and then 1.8 $cm^3$ of 1 $mol/cm^3$ sulfuric acid was added, which was followed by centrifugal separation (at 3700 rpm, for 30 minutes) and decantation. Next, precipitate obtained by the decantation was redispersed in ethanol, which was followed by centrifugal separation (at 3500 rpm, for 30 minutes) and decantation. Precipitate obtained by repeating this washing operation twice was put into a bottle, a mixed solution of 5 $cm^3$ of ethanol and 0.5 $cm^3$ of water was added to the bottle, and then, supersonic wave stirring was performed (for one hour). As a result, a dispersion solution of silane-coated complex oxide particles was obtained.

Next, 3 $cm^3$ of water, 30 $cm^3$ of ethanol, and 4 g of N-[3-(trimethoxysilyl)propyl]-N'-(4-vinylbenzyl)ethylenediamine hydrochloride (a 40% methanol solution) were mixed and stirred for 7 minutes, and then, the whole quantity of the above-described dispersion solution of silane-coated complex oxide particles was added thereto. Subsequently, this mixed solution was stirred for 10 minutes, and then subjected to centrifugal separation (at 3500 rpm, for 30 minutes) and decantation. After that, precipitate obtained by the decantation is redispersed in ethanol, which was followed by centrifugal separation (at 3500 rpm, for 30 minutes) and decantation. Precipitate obtained by repeating this washing operation twice was dried for 6 hours in a decompression environment at room temperature, and then dried for 2 hours in a decompression environment at 70° C., so that a solid was obtained.

Next, 50 $cm^3$ of toluene was added to the solid, and then stirred for 12 hours with a roll mill. The resultant was then moved into a three neck flask, 1.7 g of 2-ethyl hexyl acrylate was added thereto, and then was stirred for 20 minutes in a nitrogen gas stream. Next, after the mixed solution was further stirred at 50° C. for 20 minutes, 3 $cm^3$ of toluene solution in which 0.01 g of AIBN was dissolved was added thereto, and the mixed solution was then heated at 65° C. Subsequently, after the mixed solution was stirred for 1 hour and then cooled to room temperature, this mixed solution was poured into a bottle together with ethyl acetate. After the bottle was subjected to centrifugal separation (at 3500 rpm, for 30 minutes) and decantation, precipitate obtained by the decantation was redispersed in ethyl acetate, which was followed by centrifugal separation (at 3500 rpm, for 30 minutes) and decantation. After this washing operation by ethyl acetate was repeated three times, obtained precipitate was dried for 12 hours in a decompression environment at room temperature, and was further dried for 2 hours in a decompression environment at 70° C. As a result, black migrating particles formed of a polymer coated pigment were obtained.

After the migrating particles were prepared, an insulating liquid containing 0.5% of methoxysulfonyloxymethane (Solsperse17000 made by The Lubrizol Corporation) and 1.5% of Sorbitan Laurate (Span 20) as a dispersant and a charge control agent was prepared. As an insulating liquid, isoparaffin (IsoparG made by Exxon Mobil Corporation) was used. Then, 0.1 g of the above-described migrating particles were added to 9.9 g of this solution, and the resultant solution was stirred for 5 hours with a beads mill, then zirconia beads (0.03 mm in diameter) were added, followed by stirring for 4 hours with a homogenizer. After that, the zirconia beads were removed and an average particle diameter of the migrating particles was measured, and thus the average diameter of 100 nm was obtained. Zeta electrometer particle diameter measurement system ELSZ-2

(manufactured by Otsuka Electronic Co., Ltd.) was used for the measurement of the average particle diameter.

On the other hand, the porous layer was formed in the following manner. First, as a material of fibrous structure, polymethyl methacrylate was prepared. After 14 g of polymethyl methacrylate was dissolved in 86 g of N,N'-dimethylformamide, 30 g of titanium oxide as non-migrating particles having a primary particle diameter of 250 nm was added to 70 g of the solution, and the resultant was mixed with a bead mill. As a result, a spinning solution for forming the fibrous structure was obtained. After pixel electrodes formed of ITO in a predetermined pattern were formed on a drive substrate, spinning was performed with use of the spinning solution. Specifically, the spinning solution was put into a syringe, and spinning for 1.2 mg/cm$^2$ was performed on the drive substrate. By the above-described steps, a porous layer (fibrous structure holding non-migrating particles) was formed on the drive substrate. The spinning was performed with use of an electric field spinning apparatus (NANON manufactured by Mecc Co., Ltd.). A surface potential of formed fibrous structure was measured with use of zeta potential measurement apparatus (SurPASS manufactured by Anton Paar GmbH), and thus −7 mV was obtained. Measurement was performed using a value at pH7 as the surface potential.

After the porous layer was formed on the drive substrate, unnecessary porous layer was removed from the drive substrate. Specifically, the porous layer at a part where the pixel electrodes were not provided was removed. As the opposing substrate, opposing electrodes formed of ITO were formed on a plate member, and a spacer was disposed on the opposing substrate. The spacer used was obtained by drawing a photocurable resin (photosensitive resin Photorec A-400 (registered trademark) made by Sekisui Chemical Co., Ltd.) including beads (having outside diameter of 30 μm), and the spacer was disposed at a position not overlapped with the porous layer when being overlapped with the drive substrate. At this time, the porous layer was held by the spacer, and was distanced from the pixel electrodes and the opposing electrodes. Then, the insulating liquid in which the migrating particles were dispersed described above was injected between the drive substrate and the opposing substrate. Finally, ultraviolet rays were irradiated to a photocurable resin to complete the display unit.

Experimental Example 2

A display unit was fabricated in a manner similar to the experimental example 1 except that polyethyl methacrylate was used in place of polymethyl methacrylate. The surface potential of the fibrous structure formed of polyethyl methacrylate was −10 mV.

Experimental Example 3

A display unit was fabricated in a manner similar to the experimental example 1 except that polyethyl acrylate was used in place of polymethyl methacrylate. The surface potential of the fibrous structure formed of polyethyl acrylate was −20 mV.

Experimental Example 4

A display unit was fabricated in a manner similar to the experimental example 1 except that 25 g of titanium oxide having a primary particle diameter of 250 nm and 5 g of titanium oxide having a primary particle diameter of 700 nm were used in place of 30 g of titanium oxide having a primary particle diameter 250 nm. The surface potential of the fibrous structure was the same as that in the experimental example 1 and was −7 mV.

Experimental Example 5

A display unit was fabricated in a manner similar to the experimental example 1 except that polyacrylonitrile (polyacrylonitrile 1) was used in place of polymethyl methacrylate. Polyacrylonitrile was a molecule containing a cyano group. The surface potential of the fibrous structure formed of polyacrylonitrile 1 was −25 mV.

Experimental Example 6

A display unit was fabricated in a manner similar to the experimental example 5 except that polyacrylonitrile (polyacrylonitrile 2) in which an amount of sulfonic acid group is increased in a main framework from polyacrylonitrile in the experimental example 5 was used. The surface potential of the fibrous structure formed of polyacrylonitrile 2 was −65 mV.

Experimental Example 7

A display unit was fabricated in a manner similar to the experimental example 1 except that polystyrene was used in place of polymethyl methacrylate. Polystyrene was a molecule that contains a phenyl group having a cyclic structure. The surface potential of the fibrous structure formed of polystyrene was −12 mV.

As properties of the display units of the experimental examples 1 to 7, contrast (CR) and an average mobility immediately after fabrication, and contrast after consecutive driving for one week were examined. The results are illustrated in Table 1.

The contrast was calculated from white reflectance (%) and black reflectance as the contrast=the white reflectance (%)/the black reflectance (%). As for the white reflectance and the black reflectance, after am AC voltage (0.1 Hz and 15V) was applied to the display unit for one hour, reflectance in the normal direction of the substrate to a standard diffuser in ring illumination at 45 degrees to 0 degree was measured using a spectrophotometer (eye-one pro manufactured by X-Rite Inc.). The contrast was measured again in a similar manner after an AC voltage (0.1 Hz and 15V) was applied and consecutive driving was performed for one week.

An average mobility (μm$^2$N·ms) was calculated with use of an average response time (ms/μm). The average response time was calculated from a time (response time) necessary for luminance change and an actual gap (a movable distance of the migrating particles between substrates) of the fabricated display unit. Here, the luminance in performing the bright display was defined as 1, and the luminance in performing the bright display was defined as 0. Specifically, an average time between a time necessary for change of the luminance from 0.1 to 0.9 while a rectangular electric field (15 V) was applied to the display unit and a time necessary for change of the luminance from 0.9 to 0.1 after the electric field application was stopped was defined as the response time. A function generator (manufactured by TOYO corporation) was used for measurement of the response time. 15 V of the application voltage was converted into unit electric field intensity (V/μm), and then the average response time (ms/μm) was divided by the unit electric field intensity to obtain the average mobility of the migrating particles.

| Experimental example | Molecule forming fibrous structure | Particle diameter of non-migrating particle (μm) | Surface potential of fibrous structure (mV) | At manufacturing Optical reflectance (%) White | At manufacturing Optical reflectance (%) Black | At manufacturing CR | Average mobility (μm²/V · ms) | After one week Optical reflectance (%) White | After one week Optical reflectance (%) Black | After one week CR |
|---|---|---|---|---|---|---|---|---|---|---|
| 1 | polymethyl methacrylate | 250 | −7 | 45 | 1.5 | 30 | 0.14 | 44 | 1.5 | 29 |
| 2 | polyethyl methacrylate | | −10 | 43 | 1.5 | 29 | 0.12 | 43 | 1.5 | 29 |
| 3 | polyethyl acrylate | | −20 | 42 | 1.5 | 28 | 0.12 | 42 | 1.5 | 28 |
| 4 | polymethyl methacrylate | 250, 700 | −7 | 48 | 1.5 | 32 | 0.17 | 47 | 1.5 | 31 |
| 5 | Polyacrylonitrile 1 | 250 | −25 | 44 | 1.5 | 29 | 0.05 | 40 | 2 | 20 |
| 6 | Polyacrylonitrile 2 | | −65 | 46 | 1 | 46 | 0.05 | 40 | 1.8 | 20 |
| 7 | polystyrene | | −12 | 30 | 3 | 10 | 0.05 | 30 | 3 | 10 |

In the above-described experimental examples 1 to 4, the fibrous structure is formed with use of the chain molecule formed of only carbon atoms, oxygen atoms, and hydrogen atoms. The average mobility obtained in the respective experimental examples 1 to 4 are about three times larger than those in the experimental examples 5 and 6 and the experimental example 7 in which nitrogen atoms and ring structure are contained in the molecule forming the fibrous structure. In other words, the response speed of the display units in the respective experimental examples 1 to 4 are improved as compared with the experimental examples 5 to 7.

Moreover, in the display units in the experimental examples 1 to 4, the contrast at manufacturing and the contrast after consecutive driving for one week are substantially the same, and high reliability is obtained. In contrast, in the experimental examples 5 to 7 having a functional group high in responsiveness, such as a cyano group and a sulfonic acid group, the contrast after one week is largely degraded as compared with the contrast at manufacturing.

Further, in the display unit of the experimental example 4 in which the non-migrating particles have particles different in primary particle diameter from one another, white reflectance is improved as compared with the case (the experimental example 1) where the non-migrating particles have the same particle diameter. Accordingly, the contrast is also improved in the experimental example 4.

Hereinbefore, although the technology has been described with referring to the embodiment and the modification, the technology is not limited to the above-described embodiment and the like, and various modifications may be made.

Note that the technology may be configured as follows.

(1)
A display unit including: in an insulating liquid,
migrating particles;
non-migrating particles having optical reflection characteristics different from optical reflection characteristics of the migrating particles; and
a fibrous structure formed of a chain molecule and holding the non-migrating particles, the chain molecule containing an ester group and having a main part formed of carbon atoms, oxygen atoms, and hydrogen atoms.

(2)
The display unit according to (1), wherein an absolute value of a surface potential of the fibrous structure is about 20 mV or lower.

(3)
The display unit according to (1) or (2), wherein the fibrous structure is formed of an acrylic resin.

(4)
The display unit according to any one of (1) to (3), wherein the chain molecule is one of polyalkylmethacrylate, polyalkylacrylate, polyalkenylmethacrylate, polyalkenylacrylate, polyalkynylmethacrylate, and polyalkynylacrylate.

(5)
The display unit according to any one of (1) to (4), wherein the chain molecule has resistance to biodegradation.

(6)
The display unit according to any one of (1) to (5), wherein a terminal of the chain molecule contains atoms different from carbon atoms, oxygen atoms, and hydrogen atoms that form the main part.

(7)
The display unit according to any one of (1) to (6), wherein a dispersant dispersing the migrating particles is contained in the insulating liquid.

(8)
The display unit according to any one of (1) to (7), wherein the non-migrating particles include large particles and small particles different in primary particle diameter from each other.

(9)
The display unit according to any one of (1) to (8), wherein
an optical reflectance of the non-migrating particles is higher than an optical reflectance of the migrating particles, and
the migrating particles perform dark display and the non-migrating particles and the fibrous structure perform bright display.

(10)
The display unit according to any one of (1) to (9), wherein a fiber diameter of the fibrous structure is about 50 nm or larger and about 2000 nm or smaller.

(11)
The display unit according to any one of (1) to (10), wherein an average pore diameter of the fibrous structure is about 0.1 μm or larger and about 10 μm or smaller.

(12)
The display unit according to any one of (1) to (11), wherein the fibrous structure is formed by an electrostatic spinning method.

(13)
The display unit according to any one of (1) to (12), wherein the migrating particles and the non-migrating particles are formed of one or more of an organic pigment, an inorganic pigment, a dye, a carbon material, a metallic material, a metal oxide, glass, and a polymer material.

(14)

An electronic apparatus provided with a display unit, the display unit including: in an insulating liquid,
migrating particles;
non-migrating particles having optical reflection characteristics different from optical reflection characteristics of the migrating particles; and
a fibrous structure formed of a chain molecule and holding the non-migrating particles, the chain molecule containing an ester group and having a main part formed of carbon atoms, oxygen atoms, and hydrogen atoms.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Insulating liquid
3 Display unit
10 Migrating particle
11, 11A Electrophoretic element
20, 20A Porous layer
21 Fibrous structure
22 Non-migrating particle
22L Large particle
22S Small particle
23 Pore
30 Drive substrate
31, 41 Plate member
32 TFT
33 Protection layer
34 Planarizing insulating layer
35 Pixel electrode
40 Opposing substrate
42 Opposing electrode
60 Spacer

The invention claimed is:

1. A display unit, comprising:
in an insulating liquid:
migrating particles;
non-migrating particles having first optical reflection characteristics different from second optical reflection characteristics of the migrating particles; and
a fibrous structure that comprises a chain molecule, wherein the fibrous structure is configured to hold the non-migrating particles,
wherein an absolute value of a surface potential of the fibrous structure is 20 mV or lower, and
wherein the chain molecule contains an ester group and a main part, wherein the main part comprises carbon atoms, oxygen atoms, and hydrogen atoms.

2. The display unit according to claim 1, wherein the fibrous structure comprises an acrylic resin.

3. The display unit according to claim 1, wherein the chain molecule is one of polyalkylmethacrylate, polyalkylacrylate, polyalkenylmethacrylate, polyalkenylacrylate, polyalkynylmethacrylate, or polyalkynylacrylate.

4. The display unit according to claim 1, wherein the chain molecule is more resistant to biodegradation than a polymer material.

5. The display unit according to claim 1, wherein the insulating liquid comprises a dispersant to disperse the migrating particles in the insulating liquid.

6. The display unit according to claim 1, wherein the non-migrating particles include first particles and second particles, and wherein a first primary particle diameter of the first particles is different from a second primary particle diameter of the second particles.

7. The display unit according to claim 1, wherein
a first optical reflectance of the non-migrating particles is higher than a second optical reflectance of the migrating particles, and
the migrating particles cause a darker display than the non-migrating particles and the fibrous structure.

8. The display unit according to claim 1, wherein a fiber diameter of the fibrous structure ranges from 50 nm to or 2000 nm.

9. The display unit according to claim 1, wherein an average pore diameter of the fibrous structure ranges from 0.1 μm 10 μm.

10. The display unit according to claim 1, wherein the fibrous structure is obtained based on an electrostatic spinning method.

11. The display unit according to claim 1, wherein the migrating particles and the non-migrating particles comprise at least one of an organic pigment, an inorganic pigment, a dye, a carbon material, a metallic material, a metal oxide, glass, or a polymer material.

12. An electronic apparatus, comprising:
a display unit, wherein the display unit comprises:
in an insulating liquid:
migrating particles;
non-migrating particles having first optical reflection characteristics different from second optical reflection characteristics of the migrating particles; and
a fibrous structure that comprises a chain molecule, wherein the fibrous structure is configured to hold the non-migrating particles,
wherein an absolute value of a surface potential of the fibrous structure is 20 mV or lower, and
wherein the chain molecule contains an ester group and a main part, wherein the main part comprises carbon atoms, oxygen atoms, and hydrogen atoms.

* * * * *